United States Patent Office 3,403,960
Patented Oct. 1, 1968

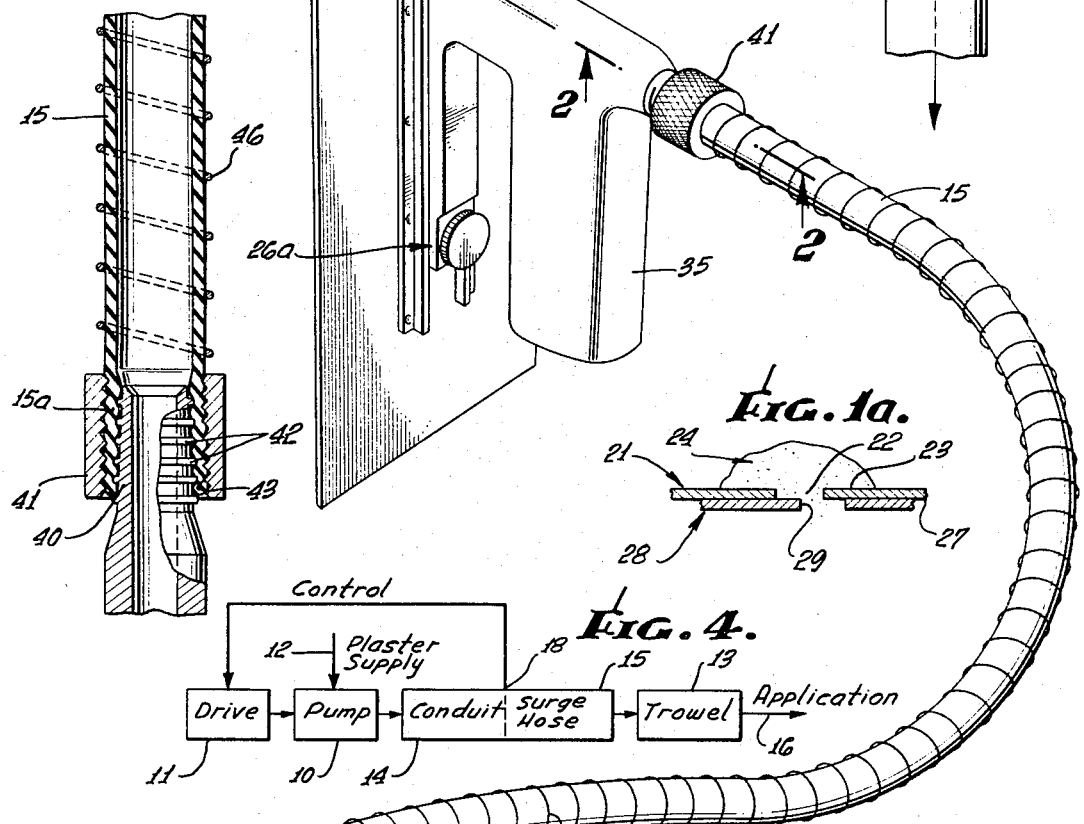

3,403,960
**PLASTER DELIVERY MEANS FOR
CONTROLLABLE FEED TROWEL**
Louis M. Ballard, Arcadia, and Robert A. Nielsen, Sherman Oaks, Calif., assignors to Trowel Fast, Inc., Azusa, Calif., a corporation of California
Filed Mar. 17, 1967, Ser. No. 624,046
6 Claims. (Cl. 401—188)

ABSTRACT OF THE DISCLOSURE

The invention concerns delivery of plaster from a pump to a dispensing head in such manner as to overcome surge-created problems. A thin walled surge hose is releasably attached to the head and also confined by metal wire coil turns so as to prevent hose bursting and also to permit rapid detachment of the hose from the head.

Background of the invention

This invention relates generally to plastering, and more particularly concerns pressure delivery of plaster via a flexible conduit from a source to a troweling head.

It is known to deliver plaster via a flexible conduit to a troweling head, with conduit flexibility accommodating ready manipulation of the trowel as required during plastering. However, delivery of liquid plaster under pressure to the trowel head introduces the problem of surge at the conduit especially during starting up of the plaster displacing pump. The problem is aggravated where the conduit or hose is of thin walled elastomer construction as is desirable for maximum flexibility and ease of use of the equipment, since bursting can result. Also, the thin walled hose can become detached from the head under pressure conditions. Further, there is need of a type of attachment of the hose to the head that will accommodate ready and rapid attachment of the hose terminal to the head, and detachment, to enable cleaning of the head following usage.

Summary of the invention

It is a major object of the invention to provide solutions to the above problems and requirements, and the invention supplies such solutions through the provision of an unusually advantageous combination of elements, as will be seen. Basically, the improvement comprises a nipple on the troweling head in plaster feeding communication with porting in the head through which plaster slurry is controllably displaced under pressure to the trowel blade; a flexible elastomer hose having a terminal received over the nipple, the hose adapted to deliver the slurry to the nipple and to expand in response to such pressurized delivery, a major flexible extent of the hose extending free of the nipple; and confinement means on the hose blocking expansion thereof at the nipple and also blocking expansion of the free extent of the hose while accommodating flexing thereof. Typically the confinement means includes peripheral ribbing on the nipple and overlapped by the hose terminal, and an internally threaded nut received on the hose terminal and rotated to forcibly and tightly clamp the hose terminal onto the ribbing. In this regard, the nut threading and nipple are advantageously tapered.

The confinement means also typically includes metallic wire closely spiraling about the hose free extent, the wire having openly spaced turns so as to accommodate hose flexing while performing the expansion blocking function. Such expansion of the hose occurs for example during start-up of the plaster slurry pump which delivers the liquid plaster to the hose via a heavy flexible conduit to which the hose is connected. Lightweight construction of the hose is exemplified by wall thickness less than .100 inch, and length greater than 12 inches.

These and other objects and advantages of the invention, as well as the details of illustrative embodiments, will be more fully understood from the following detailed description of the drawings, in which:

Brief description of the drawings

FIG. 1 is a perspective showing of a trowel head with flexible hose attached, in accordance with the invention;

FIG. 1a is a section showing plaster delivery to the trowel blade;

FIG. 2 is an enlarged section taken on line 2—2 of FIG. 1;

FIG. 3 is a view like FIG. 2 but showing hose expansion restraint exerted by the wire coil; and FIG. 4 is a diagrammatic view showing the overall system.

Description of the preferred embodiments

Referring first to FIG. 4, the illustrated system includes plaster slurry pump 10 driven at 11, as by a suitable motor and clutch. Plaster slurry supplied at 12 to the pump typically includes any material, particularly a settable cementitious substance such as hydrated lime, capable of application by troweling. The slurry is delivered to the trowel head 13 via a long heavy conduit 14 and a short lightweight flexible hose 15 connected in series, for application at 16. The hose 15 enables ready manipulation of the trowel with minimum encumbrance by the heavier conduit. A control indicated at 17 enables the user to control delivery of pressurized plaster at the head, whenever desired. For example, an electrical switch at 18, proximate the interconnection of the conduit and hose, is manipulable by the user with one hand, while he holds the trowel in the other hand, to control energization of a clutch in the drive that in turn controls transmission of drive from a prime mover means to the pump.

Extending the description to FIG. 1, the trowel 13 typically includes a blade 21 containing an opening or openings as seen at 22 in FIG. 1a, through which plaster slurry is delivered at 24 under pressure to the working surface 23 of the blade. Such delivery is from within an elongated hollow manifold 25 attached at 26 and 26a to the opposite side 27 of the blade, to extend lengthwise thereof. A valving plate 28 is slidable within the manifold to control flow of plaster through blade opening 22, and for this purpose the plate may have a corresponding opening 29 variably registrable with blade opening 22. Attached to the plate is a lug 30 projecting through a side notch 31 in the manifold for exposure to and manipulation by the user's thumb or finger, for selectively moving the plate to control plaster delivery. Typically, the lug and plate are moved to register openings 22 and 29 sufficiently to receive delivery of a desired quantity 24 of plaster, after which such delivery may be cut off during the application of the plaster to a working surface, as by operation of switch 18.

While the trowel is being used, the handle 35 is grasped in one hand by the user, and his opposite hand grasps the coupling 36 between the heavy (larger diameter and thicker wall) conduit 14 and the more flexible hose 15, in order to operate the switch 18. The hose is much lighter than conduit 14, and is preferably of thin walled construction, i.e., less than .100 inch wall thickness. Typically, the hose consists of a section of soft rubber, between 12 and 18 inches in length, about ⅝ inch outer diameter, and between about .030 to .060 inch in wall thickness. Not only does the hose accommodate freedom of trowel head movement, but it also has the beneficial function of acting as a surge means, in the sense that its expansion cushions the pressures resulting from sharp changes in plaster rate of flow, as upon start-up or shut-down. On the other hand, undesirable momentary extreme pressurization of the hose, particularly during surging, or pump start-up, can result in bursting or disconnection from the trowel.

In accordance with the invention, confinement means is provided on the hose to perform multiple functions, including blocking expansion of the hose at the nipple which could induce disconnection, and also blocking undesired expansion of the major free length of the hose while accommodating flexing thereof without kinking. To this end, the confinement means includes peripheral ribbing on the nipple 40 and overlapped by the hose terminal 15a, and an internally threaded nut 41 received on the hose terminal and rotated or tightened to forcibly and tightly clamp the hose terminal onto the ribbing. In this regard, both the nipple and nut are axially tapered as shown, to create the tightening effect. Further, the ribs 42 on the nipple are preferably annular so that the nut internal spiral threading 43 crosses the ribs at many locations of reduced spacing wherein the hose terminal is subjected to maximum squeezing. At the same time the ribs and threading remain spaced apart, and the hose material is displaced into the annular grooves between the ribs and into the spiral grooving formed by the nut threading for retaining the nut on the hose terminal and for retaining the latter on the nipple. The latter permits the nut to advance or climb onto the hose terminal in a tightening direction as the nut is rotated.

The confinement means blocking undesired expansion of the major free length of the hose typically includes metal wire closely spiraling about a section of the hose, as for example along its major extent. As an example the wire coil 46 has openly spaced turns and is wound about the hose from the nipple to the coupling 36. As the hose expands in the direction of arrows 47 in FIG. 3, in response to plaster pressure, the coil confines such expansion as indicated by the hose bulges 48, for safety purposes. At the same time, the wire allows for flexing of the hose, the coils also supporting the hose against such extreme bending or kinking as would shut off plaster flow.

From the foregoing, it is clear that the hose is confined against bursting, it remains free to flex; it cannot kink to shut off plaster slurry flow, it cannot release from the nipple without unscrewing of the nut 41, such release may be quickly accomplished when desired as for trowel cleaning, and the operation of the entire apparatus is benefited to unusually advantageous extent.

We claim:
1. For combination with apparatus including a dispensing head having porting through which plaster slurry is controllably displaced, and a nipple on the head in plaster feeding communication with said porting, the improvement comprising
   a flexible elastomer hose having a terminal received over the nipple, the hose adapted to receive pressurized plaster slurry for delivery to the trowel head porting via the nipple, and the hose adapted to expand in response to such pressurized plaster reception, a major flexible extent of the hose extending free of the nipple,
   and confinement means on the hose blocking expansion thereof at the nipple and also blocking expansion of free extent of the hose while accommodating flexing thereof without kinking.

2. The improvement of claim 1 in which said means includes peripheral ribbing on the nipple and overlapped by the hose terminal, and an internally threaded nut received on the hose terminal and rotated to forcibly and tightly clamp the hose terminal onto said ribbing.

3. The improvement of claim 2 in which said nut threading is axially tapered, and said ribbing is annular so that the nut threading crosses the ribbing at multiple hose terminal squeeze locations.

4. The improvement of claim 1 in which said means includes metal wire closely spiraling about the hose along said major extent thereof, the wire having openly spaced turns.

5. The improvement of claim 1 including said head and nipple, a plaster slurry pump and a heavy flexible conduit extending between the pump discharge and said hose, means to supply plaster slurry to the pump, to drive the pump and to control said drive so as to intermittently pressurize the plaster in said hose, the head having a valve to block and unblock plaster delivery at the head.

6. The improvement as defined in claim 1 wherein the hose has a wall thickness of less than .100 inch and is at least 12 inches in length.

References Cited
UNITED STATES PATENTS

| | | | |
|---|---|---|---|
| 532,645 | 1/1895 | Cushing et al. | 15—547 |
| 1,053,645 | 2/1913 | Reimer | 15—547 XR |
| 2,022,777 | 12/1935 | MacKenzie | 15—547 |
| 2,683,466 | 7/1954 | Guiles | 138—109 XR |
| 3,005,469 | 10/1961 | Kenney | 138—153 XR |

CHARLES A. WILLMUTH, *Primary Examiner.*

ROBERT I. SMITH, *Assistant Examiner.*